Figure 1:
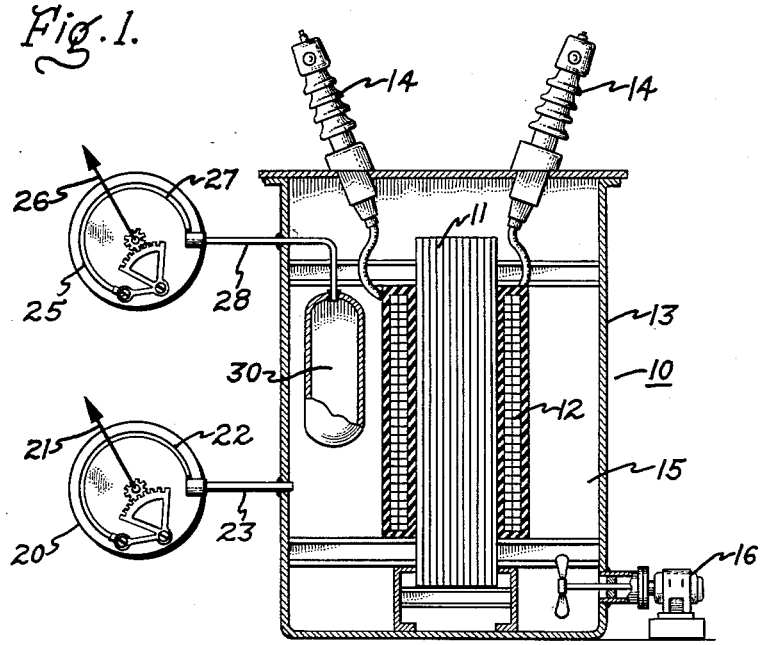

June 27, 1961 G. CAMILLI ET AL 2,989,863
GAS LEAKAGE DETECTING MEANS
Filed May 15, 1958 2 Sheets-Sheet 1

Inventors,
Guglielmo Camilli,
Andrew W. Galloway,
by Gilbert P. Tarleton
Their Attorney.

June 27, 1961 G. CAMILLI ET AL 2,989,863
GAS LEAKAGE DETECTING MEANS
Filed May 15, 1958 2 Sheets-Sheet 2
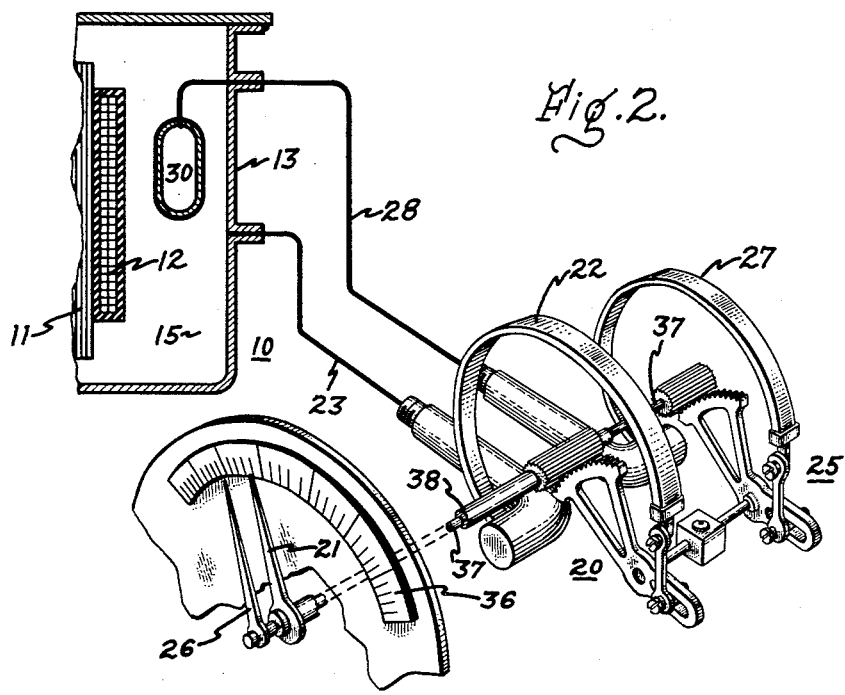
Fig. 2.
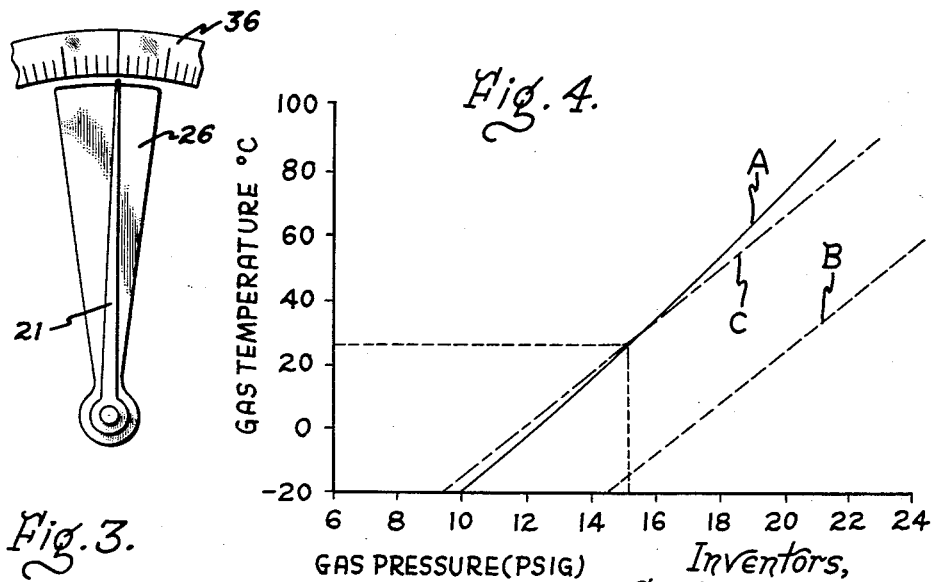
Fig. 3.
Fig. 4.
Inventors,
Guglielmo Camilli,
Andrew W. Galloway,
by Gilbert P. Tarleton
Their Attorney.

United States Patent Office 2,989,863
Patented June 27, 1961

2,989,863
GAS LEAKAGE DETECTING MEANS
Guglielmo Camilli and Andrew W. Galloway, Pittsfield, Mass., assignors to General Electric Company, a corporation of New York
Filed May 15, 1958, Ser. No. 735,628
11 Claims. (Cl. 73—49.3)

This invention relates to the measurement of pressure within sealed gas filled enclosures subject to thermal variation, and more in particular to means for detecting the occurrence of leaks in such enclosures. While the invention has particular application in the detection of leaks of dielectric gas from gas filled transformers and the like, it will be obvious that the scope of the invention is not thus limited.

With the relatively recent development of high dielectric strength gases, such as sulphur hexafluoride, the many advantages of employing such gases as the dielectric material in transformers have become well known. For example, the weight of a transformer filled with sulphur hexafluoride is considerably less than an equivalent transformer employing oil as the dielectric medium.

In order to obtain the maximum benefit from the dielectric properties of the gaseous insulation, it is desirable that the gas in the transformer tank be pressurized, since the dielectric strength of electronegative gases increases with increases in pressure. When the necessary dielectric strength of the transformer depends upon the maintenance of pressure of the gaseous dielectric, it is of course important that the occurrence of any leak in the sealed transformer enclosure be readily detected. The detection of leaks is complicated by the fact that normal thermal variations of the transformer result in variation in the pressure of the gas, so that detection of the absolute pressure of the gas in the enclosure does not provide an accurate indication of the occurrence of leaks. In previous devices the detection of leaks has also been complicated by the possibility that malfunctioning of the indicating device may result in erroneous indication of the occurrence or absence of leaks.

It is, therefore, an object of this invention to provide improved means for detecting the occurence of leaks in a sealed gas filled tank subject to thermal variation.

A still further object of this invention is to provide means for detecting the occurrence of leaks in a sealed gas filled tank subject to thermal variation, the means being characterized in that it differentiates between pressure variation resulting from leaks in the tank, pressure variation resulting from normal thermal variation, and pressure variation resulting from malfunctioning of portions of the detecting means.

Briefly stated, in accordance with the invention, we provide means for detecting leaks in a sealed gas filled tank subject to thermal variation. The detecting means comprises a sealed enclosure disposed within the tank, the enclosure containing a gas having substantially the same pressure temperature characteristics as the gas in the tank and being substantially surrounded by the gas in the tank. The pressure of the gas in the tank and enclosure are different, and means may be provided for indicating the direction of relative variation in pressure between the tank and the enclosure when a leak occurs.

The pressure indicating means are preferably combined in a double pressure gauge, with the two pointers of the gauge being set to indicate the same pressure in the absence of leaks in the tank. Since the actual pressure within the enclosure is initially set different from the pressure in the tank, the detecting arrangement of the invention differentiates between leaks in the tank and leaks in the enclosure.

While the specification concludes with claims particularly pointing out and distinctly claiming the subject matter which we regard as our invention, it is believed that the invention will be better understood from the following description taken in connection with the accompanying drawings.

Figure 5:
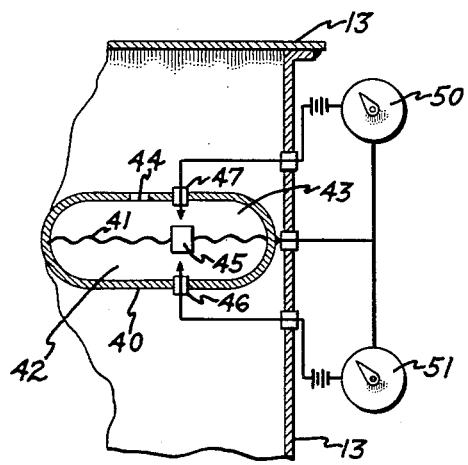

In the drawings:

FIG. 1 is a cross-sectional view of a transformer and illustrating one modification of the leakage detection arrangement of the invention, FIG. 2 is a perspective view of a double pressure gauge and illustrating the preferred manner of connecting the gauge to indicate the leakage of pressure in a transformer, according to the invention, FIG. 3 is a front view of a modified form of the indicating pointers and dial of the gauge of FIG. 2, FIG. 4 is a graph of the relationship between pressure and temperature of a typical electronegative gas, such as sulphur hexafluoride; and FIG. 5 is a cross-sectional view illustrating another modification of the leakage detection arrangement of the invention.

Referring now to the drawings, and more in particular to FIG. 1, therein is illustrated a transformer 10 comprising a magnetic core 11 and windings 12 enclosed in a sealed tank 13. External connections may be made to the windings by means of insulating bushings 14 extending through the top of the tank 14. The tank is filled with a gaseous dielectric material 15, such as sulphur hexafluoride, and means such as a circulating pump 16 may be provided to circulate the gas throughout the tank to effect the cooling of the core and coils.

A pressure indicating device 20 is provided, and may be of the conventional type having a pointer 21 whose angular position is a function of the pressure in a Bourdon tube 22. The position of the pointer 21 is made a function of the pressure within the tank 13, such as by connecting the Bourdon tube 22 to the tank by means of a tube 23. A second pressure indicating device 25 is also provided, and the indicating device 25 has a pointer 26 actuated, for example, by Bourdon tube 27. The Bourdon tube 27 is connected, by way of a tube 28, to a sealed chamber 30 disposed within the tank 13. In this modification of the invention, the chamber 30 has a volume that is substantially greater than the volume enclosed by the remainder of the system (i.e. Bourdon tube 27 and the tube 28). The chamber 30 is preferably filled with the same kind of dielectric material as the tank 13.

The pressure indicating devices of the arrangement of FIG. 1 is preferably combined, as illustrated in FIG. 2, so that the pointers 21 and 26 are employed in combination with the same dial 36. In this arrangement, conventional Bourdon movements are employed for each of the indicating devices, and the indicating shaft of one of the indicating devices extends through the indicating shaft of the other indicating shaft. Thus, in FIG. 2, the indicating shaft 37 of indicating device 25 extends through the indicating shaft 38 of indicating device 20.

For reason that will be disclosed in more detail in the following paragraphs, the indicating pointer 26 may be sector-shaped, and pivoted at its axis (FIG. 3). The included angle of the sector is equal to the angle on the dial 36 corresponding to the differential in pressure between the thermal variations of pressure of the gas in the chamber and tank within the normal range of operating temperatures of the transformer.

In FIG. 5 is illustrated another modification of the invention, in which a chamber 40 is provided within the tank 13. In this arrangement, a metallic diaphragm 41 is provided within the chamber and separating the chamber into a sealed compartment 42 and a compartment 43 communicating with the tank 13 by way of an aperture 44 in the chamber wall. The diaphragm 41 is provided with a contact 45 adapted to engage a contact 46 mounted in the sealed compartment 42 when the pressure of the compartment 42 decreases with respect to the pressure in the tank, and to engage a contact 47 mounted in the compartment 43 when the pressure in the tank decreases with respect to the pressure in the sealed compartment 42. The sealed compartment 42 is preferably filled with the same gaseous material as the tank. Suitable indicating devices, such as the indicating devices 50 and 51 connected respectively to the diaphragm and contact 47 and the diaphragm and contact 46, may be provided to indicate the engagement of contact 45 with the contacts 47 and 46 respectively.

*Operation*

In the arrangement of FIG. 1, assuming that the tank and enclosure are initially filled with gases having substantially the same pressure-temperature characteristics at the same pressure and temperature, the pressures indicated by the pointers 21 and 26 would be the same unless a leak occurs in the tank. Since the chamber 30 has a volume much greater than the Bourdon tube 27 and tube 28, inaccuracies in the pressure indicated by the pointer 26 due to pressure variation as a result of external temperature effects on the Bourdon tube 27 and tube 28 will be negligible. If a leak occurs in the tank 13, the pressure in the tank will decrease, and hence the pointer 21 will no longer indicate the same pressure as the ponter 26. For this reason, it is desirable to provide a double pressure gauge with the pointers having a common axis. If, without the presence of a leak, the pointers are initially set to read the same pressure, a leak will be indicated if the pointers tend to move apart. In order that the two pointers coincide over the full range of thermal variation of the transformer, it is desirable that the kind of same gas be employed in the chamber 30 as in tank, so that the pressure-temperature characteristics of the gases in the chamber and tank are the same.

If a leak occurs in the chamber 30, however, the two pointers will continue to indicate the same pressure, regardless of the existence of a leak in the tank. Therefore, it has now been found that in order to be assured of the accuracy of the system, it is desirable that the initial pressure within the chamber 30 be different than the initial pressure within the tank in this case. Although the initial pressures detected by the two indicating devices are different, the two pointers are initially set to indicate the same pressure. Then, if a leak occurs in either the chamber 30 or tank 13, the pointers will diverge. For example, if the pressure within the chamber is initially greater than the pressure within the tank, then a decrease in the pressure indicated by the pointer 21 with respect to the pressure indicated by the pointer 26 will indicate a leak in the tank, while a decrease in the pressure indicated by the pointer 26 with respect to the pressure indicated by the pointer 21 will indicate a leak in the chamber 30. Similarly, if the pressure in the chamber 30 is initially less than the pressure in the tank, a relative increase in pressure indicated by pointer 26 indicates a leak in the chamber, and a relative decrease in pressure indicated by pointer 21 indicates the occurrence of a leak in the tank. Thus, when the pressure in the chamber 30 is initially different from that in the tank 13, the direction of relative variation in the pressures indicated by the pointers will reveal whether the leak is in the tank 13 or in the chamber 30.

While providing a different pressure of gas in the chamber than in the tank enables the detection of a leak in the chamber, a slight indication error may occur in this arrangement due to the pressure temperature-characteristics of the gas employed. Thus, referring to FIG. 4, the curve A represents the variation of pressure with temperature of a typical high dielectric strength gas when the pressure is initially set at, for example, 15 pounds per square inch gauge when the temperature is 25° C. This curve represents the pressure indicated by pointer 21. Curve B represents the variation of pressure with temperature of the same gas when the pressure is initially set at about 20 pounds per square inch gauge at a temperature of 25° C. Since in the preferred embodiments of the invention the pointers 21 and 26 are initially set to indicate the same temperature, the curve C, having the same slope as curve B and intersecting the initial setting point of curve A, represents the pressure indicted by the dial 26. Since the slopes of curves A and C are not the same, a slight error will be present in the indication since the pointers 21 and 26 will not always coincide, even though no leak occurs. For this reason, it is desirable, as shown in FIG. 3, that the pointer 26 be sector-shaped, the included angle of the pointer corresponding to the pressure differential, due to the difference in the slopes of curves A and C, between the pressures indicated by the pointers 21 and 26 over the normal range of operating temperatures of the transformer.

In the arrangement of FIG. 1, since the gases in the chamber 30 and tank have the same or substantially the same pressure-temperature characteristics, this arrangement has the advantage that the linkages and gear ratios in the indicators 20 and 25 may be the same. A further advantage is derived in that the same gas may be employed in the chamber 30 as in the tank, so that in the event of a leak in the chamber there will be no contamination of the gas in the tank.

In the arrangement of FIG. 5, the gas in the sealed compartment 42 has the same pressure-temperature characteristics as the gas in the tank, and the pressure in the compartment 42 is initially set to be different than the pressure in the tank.

If the pressures were both the same, indication of a leak in the tank would be provided, since the resultant relative decrease in the pressure in the tank would result in the diaphragm 41 flexing to complete an electric circuit between contacts 45 and 47, and thus the providing an indication of the leak by the indicating device 50. In this event, the occurrence of a leak in the compartment 42 would not be indicated. If, however, the pressure in the compartment 42 is initially greater than the pressure in the tank, a leak in the compartment 42 would result in release of pressure from the compartment 42, and the flexing of the diaphragm to complete the circuit between the contacts 45 and 46. Thus, a leak in the compartment 42 would be indicated by the indicating device 51. Therefore, actuation of one indicating device 50 or 51 will reveal whether the leak is in the tank 13 or the chamber 30 because each device indicates a direction in which the relative pressure is varying.

It will be understood, of course, that while the forms of the invention herein shown and described constitute preferred embodiments of the invention, it is not intended herein to illustrate all of the equivalent forms or ramifications thereof. It will also be understood that the words used are words of description rather than of limitation, and that various changes may be made without departing from the spirit or scope of the invention herein disclosed, and it is aimed in the appended claims to cover all such changes as fall within the true spirit and scope of the invention.

What we claim as new and desire to secure by Letters Patent of the United States is:

1. Means for detecting leakage in a sealed gas filled tank subject to thermal variation comprising a sealed enclosure in said tank containing a gas having substantially the same pressure-temperature characteristics as the gas in said tank, the pressures of the gas in said tank and enclosure being different, and means independently indicating the pressure in said tank and enclosure for determining whether a leak is in the tank or in said sealed enclosure.

2. Means for detecting leakage in a sealed gas filled tank subject to thermal variation comprising a sealed enclosure disposed within said tank, said enclosure containing a gas having substantially the same pressure-temperature characteristics as the gas in said tank and being substantially surrounded by the gas in said tank, the pressure of the gas in said enclosure being different from the pressure of the gas in said tank, means indicating the pressure in said enclosure, and independent means indicating the pressure in said tank, the indications of pressure appearing on both of said indicating means being the same for at least one predetermined temperature of the gas in said tank, whereby said indicating means will reveal whether a leak is in the tank or in said sealed enclosure.

3. Means for detecting leakage in a sealed gas filled tank subject to thermal variation comprising a sealed enclosure disposed within said tank, said enclosure containing a gas having substantially the same pressure-temperature characteristics as the gas in said tank and being substantially surrounded by the gas in said tank, the pressures of the gas in said tank and enclosure being different, means indicating pressure in said enclosure, and means independently indicating the pressure in said tank, said indicating means comprising a pressure indicating device having a pair of indicating pointers mounted for rotation on separate axes, said pointers being substantially aligned in the absence of leaks in said tank or enclosure.

4. Means for detecting leakage in a sealed gas filled tank subject to thermal variation comprising a sealed enclosure in said tank containing a gas having substantially the same pressure-temperature characteristics as the gas in said tank, the pressures of the gas in said tank and enclosure being different, and means independently indicating the pressure in said tank and enclosure, said means comprising a pressure indicating device having a pair of indicating pointers actuated independently by a pair of Bourdon tubes, one of said Bourdon tubes being connected to said tank and the other being connected to said enclosure, said pointers being substantially aligned in the absence of leaks in said tank or enclosure.

5. The arrangement of claim 4 in which the volume of said enclosure is substantially larger than the volume of the Bourdon tube connected thereto.

6. The arrangement of claim 4 in which the gas in said enclosure is the same kind as the gas in said tank.

7. Means for detecting leakage in a sealed gas filled tank subject to thermal variations comprising a sealed enclosure in said tank containing gaseous material of the same kind as in said tank, the gas in said enclosure having a higher pressure than the gas in said tank and means indicating the direction of relative variation between the pressure in said tank and the pressure in said enclosure for determining whether a leak is in the tank or in said sealed enclosure.

8. Means for detecting leakage in a sealed gas filled tank subject to thermal variations comprising a sealed enclosure in said tank containing gaseous material of the same kind as in said tank, the gas in said enclosure having a higher pressure than the gas in said tank, a pressure indicating device having a pair of indicating pointers, one of said pointers being actuated by a Bourbon tube connected to said enclosure, the other pointer being actuated by a Bourbon tube connected to said tank, said pointers being pivoted on a common axis and being substantially aligned in the absence of leaks in said tank or enclosure at least at a predetermined gas temperature.

9. The arrangement of claim 8 in which the pointer actuated by the Bourbon tube connected to the enclosure is sector-shaped and pivoted at its apex, the angle of said sector corresponding to the differential between the thermal variations of pressure of the gas in the tank and enclosure within the normal temperature range of the gas in said tank.

10. Means for detecting leakage in a sealed gas filled tank subject to thermal variations comprising a sealed enclosure in said tank containing gaseous material of the same kind as in said tank, the gas in said enclosure having a higher pressure than the gas in said tank, a diaphragm between the gases in said enclosure and tank, means actuated by said diaphragm indicating relative decrease in the pressure in said tank with respect to the pressure in said enclosure, and means actuated by said diaphragm indicating relative decrease in the pressure in said enclosure with respect to the pressure in said tank.

11. The improved method of detecting leaks in a sealed gas filled tank subject to thermal variation comprising sealing within an enclosure a gas having substantially the same pressure-temperature characteristics as the gas in said tank, maintaining the enclosed gas at pressure different from that of the gas in said tank, surrounding the enclosed gas by the gas in said tank, indicating the pressure of the gas in said tank, independently indicating the pressure of the enclosed gas, whereby leaks in said gas filled tank will be detected by relative variations in the indicated pressures, and such leaks can be distinguished from malfunctions of the enclosed gas pressure indicator.

References Cited in the file of this patent

UNITED STATES PATENTS 2,731,825   Le Van _____ Jan. 24, 1956

FOREIGN PATENTS 978,221   France _____ Nov. 22, 1950